Nov. 22, 1960 K. R. ELDREDGE ET AL 2,961,649

AUTOMATIC READING SYSTEM

Filed March 9, 1956 2 Sheets-Sheet 1

KENNETH R. ELDREDGE
MENDOLE D. MARSH
INVENTORS

BY Lyon & Lyon

ATTORNEYS

AUTOMATIC READING SYSTEM

Filed March 9, 1956 2 Sheets-Sheet 2

KENNETH R. ELDREDGE
MENDOLE D. MARSH
INVENTORS

BY Lyon & Lyon

ATTORNEYS

United States Patent Office 2,961,649

Patented Nov. 22, 1960

2,961,649

AUTOMATIC READING SYSTEM

Kenneth R. Eldredge and Mendole D. Marsh, Palo Alto, Calif.

Filed Mar. 9, 1956, Ser. No. 570,501

12 Claims. (Cl. 340—149)

This invention relates to apparatus for reading characters in human language and providing therefrom signals representative thereof in machine language.

In an application for an Automatic Reading System, by Kenneth R. Eldredge, Ser. No. 506,598, filed May 6, 1955, which is assigned to a common assignee, there is described and claimed an apparatus and system for reading data written in human language automatically without human intervention and obtaining therefrom signals which are in a binary-coded form which can be used in information-handling machines. Described briefly, this apparatus includes an arrangement whereby the human-language data is printed in letters from which it is possible to recognize characteristic electrical wave shapes which are derived from each character. For example, the characters are printed in an ink which is capable of being magnetized. This ink is then subsequently magnetized prior to being read. The data can then be read by passing each character successively under a magnetic reading head. The output of the reading head presents a resultant wave shape which is uniquely characteristic for each different character. By a sampling technique along the wave shape, signals can be derived which can be converted into a unique voltage pattern which is a binary representation for each different character. In a second application for an Automatic Reading System, by Kenneth R. Eldredge et al., Ser. No. 508,468, filing date May 16, 1955, which is assigned to a common assignee, there is described and claimed another arrangement for reading without human intervention to provide a machine language representative of the data which is read. This second arrangement is based upon an area recognition of different characters, whereby a coded representation of each character may be derived from the recognition of the area.

The present invention is for an improved arrangement for reading human language, without human intervention, to provide a machine-language representation of the human language which is read.

An object of the present invention is to provide a new and improved arrangement for converting human language into machine language without the intervention of human readings and transcribers.

Another object of the present invention is the provision of simple and useful apparatus for converting human language into machine language.

Still another object of the present invention is the provision of an arrangement for converting human language into machine language which is simpler than those employed heretofore.

These and other objects of the invention are achieved by employing a frequency-recognition technique. Each character in the human language which is desired to be automatically converted to machine language is printed so that it is actually made up of a number of parallel fine lines. The number of these lines per unit of length for each character differs. Line spacings may range, for example, from 50 to 1000 to the inch and either the eye does not detect the presence of the lines, or, if they are visible, they do not impair conventional reading of the character. Thus, with the assignment of a specific number of lines per inch, which differs for each character, a unique method of character identification is made available by means of frequency identification. Thus, each character which has been printed is successively passed under a reading head which may employ either optical or magnetic techniques for detecting the presence thereunder of the character.

The output of the reading head, or transducer, is an electrical signal having a predominant frequency which is determined by the number of lines per unit of length of the character which has been scanned. This signal is simultaneously applied to a number of filters, each of which has a frequency-pass band which will pass only a different one of the frequencies representative of the different characters. The output of all these filters is rectified and applied to separate integrators. The predominating frequency in the signal from a character will be passed through a filter with the greatest amplitude, and also is present for the greatest length of time in the signal which is generated as a result of passing a character under the reading head. Thus, the integration of the respective signals which are the outputs of the different filters provides one which has the largest-amplitude level. This largest-amplitude-level signal is detected by employing a plurality of differential amplifiers, to which the outputs of the various rectifiers are applied. Of all these differential amplifiers, all will have a negative output except one. That is the one which is connected to the integrator having the largest amplitude signals. The signal of the differential amplifier is applied to a readout gate and energizes one out of a plurality of lines which is representative of the particular character which has just been read. If desired, the output of the various gates may be applied to a conversion matrix which has as its output the desired code for an information-handling machine.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
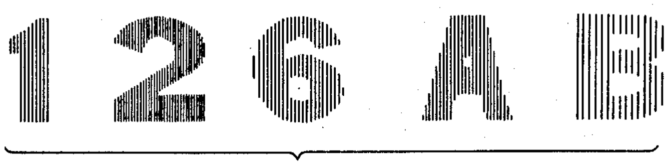
Figure 1 is a represenation of the characters printed in accordance with an embodiment of this invention.

Reference is now made to Figure 1, which shows a group of numbers which are printed in accordance with the method of this invention. These are shown by way of example and are not to be considered as the only characters which can be identified in the manner shown. As seen, the number of lines per unit of distance, or length, differs for each character. The lines are vertical, but, if desired, may be at an angle. The important thing, however, is that these lines should be passed under a transducer at an angle such that a modulation effect is derived from each character. It should be noted that the spacing of the lines for the characters shown in Figure 1 is exaggerated for the purpose of illustration. Actually, the lines need not be spaced apart as much as is shown. In an embodiment of the invention which was built, line spacing from 50 to 400 lines per inch was easily attained, and the fact that the characters were each made up of different numbers of lines was substantially undetectable with the naked eye.

The characters may be printed in the manner shown with conventional ink, and a reading thereof be obtained using photoelectric techniques, or, preferably, the characters may be printed with ink which is susceptible of being magnetized, which is magnetized prior to being read. In any event, it should be established that each character has assigned thereto a specific rate of lines per inch, which should be maintained constant for the character, and this rate differs from every other character sufficiently to allow positive character identification by subsequent apparatus. By a specific rate of lines per unit of length is meant that when a document, upon which the character is printed is moved relative to a reading head, the rate of passage of lines in the character past the reading head will be constant. It should be appreciated that the frequency which is derived from the lines of a given character can be varied by the rate of motion of that character past the reading head. Thus, it should determine in advance at what rate the document bearing the character is to be moved. The frequency assignments can then be made which will serve to distinguish the various characters, one from another. From this it is a simple matter to compute the number of lines per unit of length a character should have in order to permit the generation therefrom of the assigned frequency.

Apparatus which moves at a constant rate and permits the successive scanning of each character is known, for example, in the facsimile field and also in the machine-tool field. For example, a milling table may be controlled to provide the required motion automatically to enable the scanning of a document mounted thereon. Automatic compensation for variation in table speed may be provided by having a train of lines on the document at an inconspicuous location which can be scanned and which should provide as a result a single frequency. The deviation from this frequency can be employed to generate control signals to speed up or slow down the scanning process until it is substantially that which is required.

Figure 2:
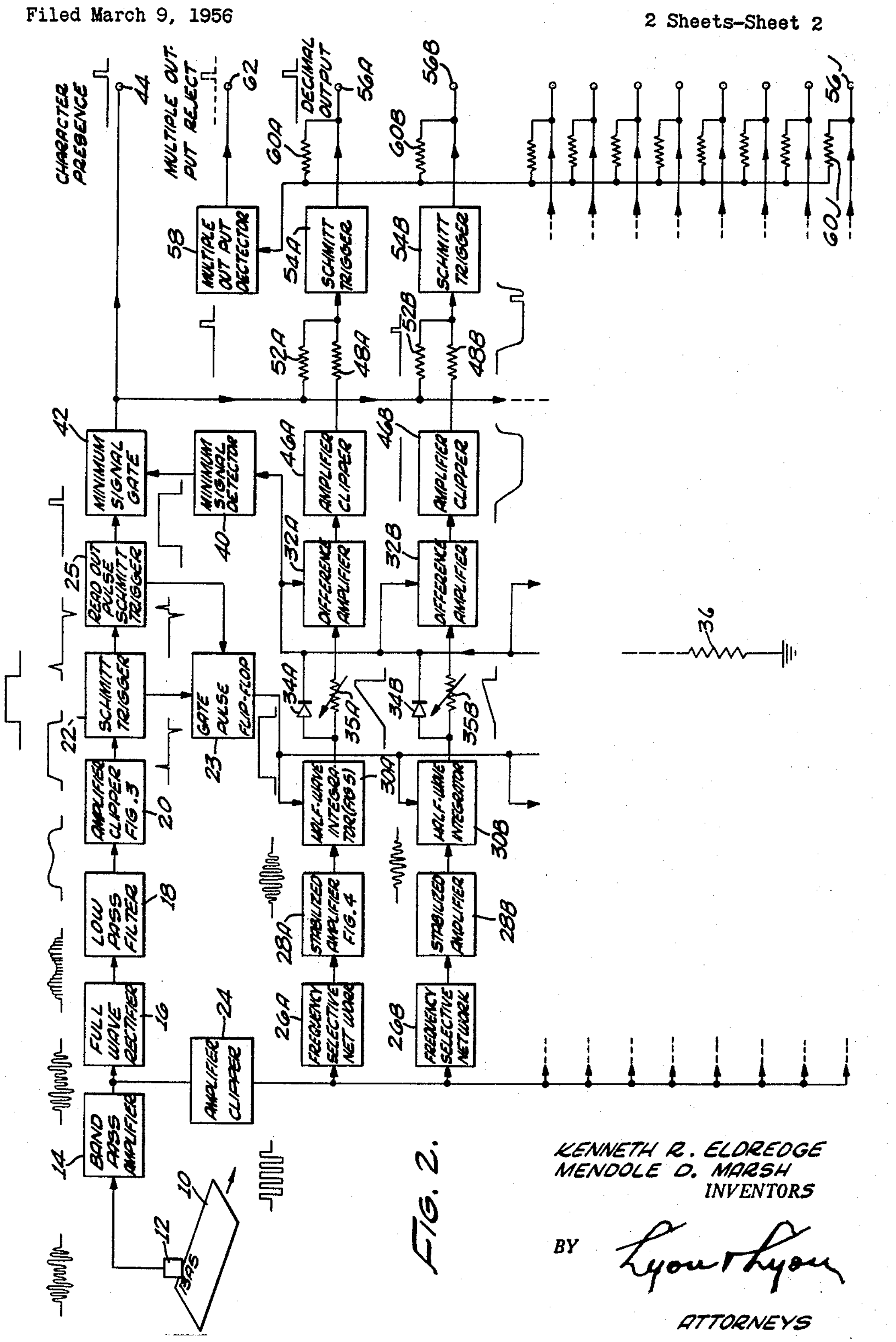
Figure 2 is a schematic diagram of this invention.

Reference is now made to Figure 2, which is a schematic diagram of the apparatus required for converting human language into machine language automatically in accordance with this invention. A document 10, upon which there has been previously printed characters with the line-frequency arrangement of the general type shown in Figure 1, is moved relative to a reading head 12 by a scanning apparatus, not shown, which moves the document relative to the reading head at a substantially constant rate. If the reading head is of the photoelectric type, then as the document is moved thereunder, the light received by the reading head is modulated at a rate which is determined by the number of lines per unit of length of each character, as well as the rate of speed of the motion of the document. If the reading head is composed of a magnetic reading head, then the gap thereof should preferably be parallel to be lines of which a character is composed, and the motion of the document should be for the purpose of obtaining the largest-signal amplitude in a direction to pass these lines successively under the reading head. Where the transducer, or reading head, is a magnetic reading head, then the character should be printed with an ink which is capable of being magnetized. A permanent magnet should then be positioned in advance of the reading head, so that the characters to be scanned first pass under the magnet to be magnetized and then pass under the magnetic reading head 12.

Typical wave shapes which occur in the operation of the apparatus are shown above each rectangle representing a circuit. The output of the reading head 12 is applied to a band-pass amplifier 14. The output of the band-pass amplifier is then applied to apparatus which may be called the character-presence detector. This apparatus includes a full-wave rectifier 16 followed by a low-pass filter 18, the output of which is amplified and clipped by an amplifier clipper circuit 20, and the output thereof is applied to a Schmitt trigger circuit 22. The output of the Schmitt trigger circuit is applied to a flip-flop circuit 23, which provides as an output a gating pulse having a duration determined by the duration of the presence of a signal under the reading head.

The function of the character-presence detector apparatus is to provide a signal indicative of the fact that a character is under the magnetic reading head and, also, when the character has passed from under the magnetic reading head. Thus, the signal which is generated by the transducer will be rectified by the full-wave rectifier and applied through the low-pass filter and amplifier clipper to actuate the Schmitt trigger circuit 22. A Schmitt trigger circuit is a flip-flop circuit having a stable condition from which it is driven by the application of a signal thereto and to which it returns when the signal is removed. A suitable Schmitt trigger circuit is found described in an article in the Journal of Scientific Instruments, vol. 15, pp. 24–26, in January of 1938, and is entitled a Thermionic Trigger. The output of the Schmitt trigger, when it is first driven from its stable condition, drives the gate pulse flip-flop 23 from one to the other of its stable states. When the Schmitt trigger is permitted to return to its stable condition, the output occurring a that time drives a succeeding Schmitt trigger circuit 25. The output from the succeeding Schmitt trigger is used to restore the flip-flop 23 to its initial condition. A suitable flip-flop circuit is shown and described on pp. 96 et seq. of the book Electronics by Elmore and Sands, which was published in 1949 by the McGraw-Hill Book Co., Inc.

Figures 3, 4:
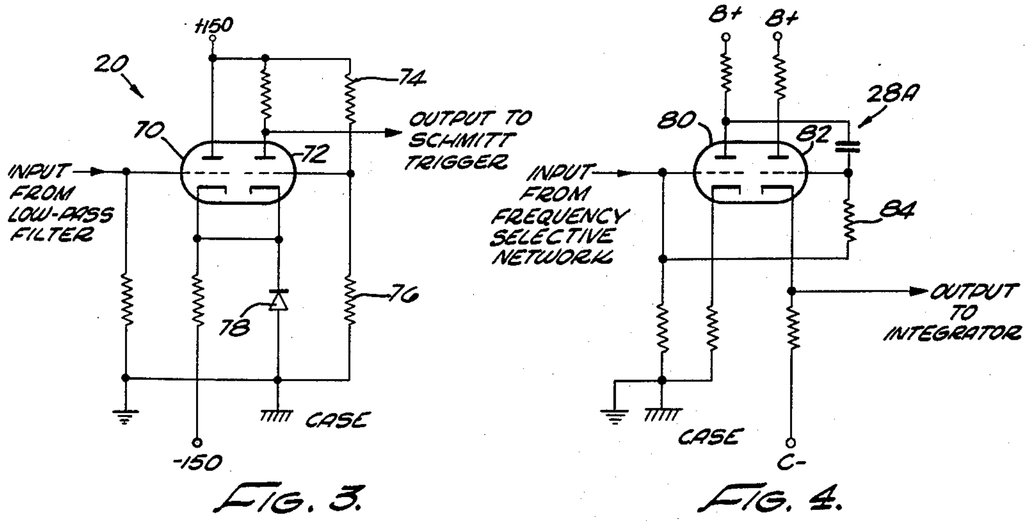
Figure 3 is a circuit diagram of a suitable amplifier-clipper circuit which may be employed in the embodiment of the invention.
Figure 4 is a circuit diagram of a suitable stabilized amplifier circuit which may be employed in the embodiment of the invention.

The output of the amplifier 14 is also applied to another amplifier and clipper circuit 24. A suitable circuit is shown in Figure 3. This circuit shapes and limits the signal amplitude range that is to be handled by subsequent apparatus. The signal, which is the output of the amplifier 24, is applied to a plurality of frequency-selective networks or filters 26A, 26B, etc. If the characters to be read are the numbers zero through nine, then ten of these frequency-selective networks are required. Each of these filters is designed to pass a different frequency, corresponding to the frequency of a character which is to be identified. Thus, a filter passing the maximum amount of energy for a given character identifies that character.

Figure 5:
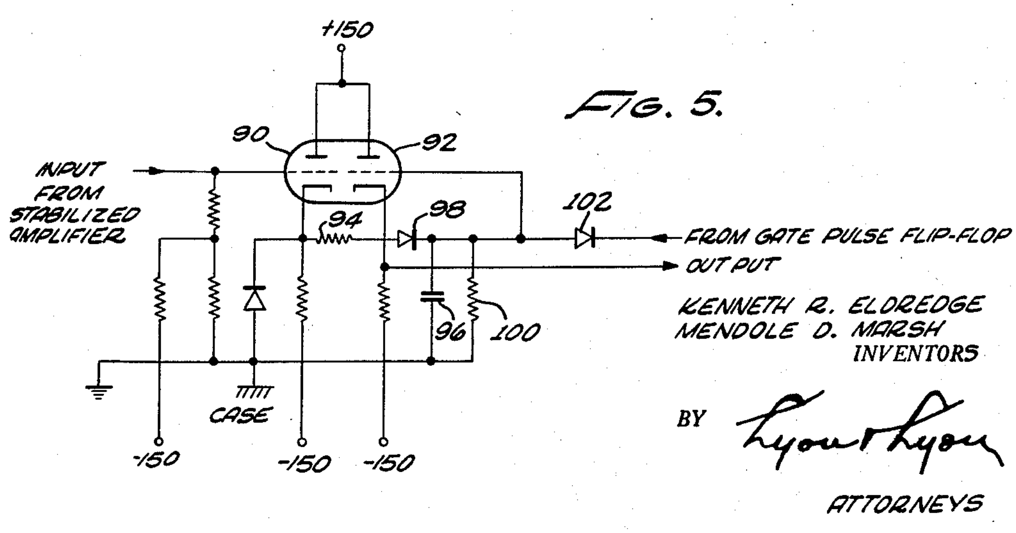
Figure 5 is a circuit diagram of a suitable integrator circuit which may be employed in the embodiment of the invention.

In order to further insure the fact that the output from the embodiment of the invention shown is truly representative of the character under the reading head, each filter has its output applied to a separate stabilized amplifier 28A, 28B, etc., which is associated therewith. A suitable stabilized amplifier circuit is shown in Figure 4. The outputs of the stabilized amplifiers are applied to associated integrating networks 30A, 30B, etc. A suitable integrating network is shown in Figure 5. These integrating networks are all gated on for a time determined by the outputs received from the flip-flop circuits 23, which is included in the character-presence-detecting apparatus. In other words, when a character appears under the reading head, the integrators are enabled. Thus, the integrators will integrate the outputs received from their associated amplifiers. The integrator having the largest output is the one which has the maximum amount of energy applied thereto, which, as was previously indicated, is received from the frequency-selective network which is tuned to the frequency of the signal which is received from the reading head 12.

Each integrator has its output applied to an associated difference amplifier 32A, 32B, etc. The output of each of the integrators is also applied to an associated rectifier 34A, 34B, etc. These rectifiers have their cathodes connected in common to a resistor 36, and, from the resistor, to one input of each of the difference amplifiers. By virtue of the interconnction of the diodes 34A, 34B, etc., despite the fact that signals may be received from all of the integrators, the diode receiving the largest amplitude signal biases off the other diodes. This occurs by virtue of the fact that the largest amplitude signal passes through a diode and, since the voltages from the remaining integrators being applied to the remaining diodes do not exceed the voltage being applied to these remaining diode-cathodes from the diode receiving the largest amplitude signal, no current can flow through these remaining diodes. Therefore, the signal applied to one input of all of the difference amplifiers is the largest of the signals received from all of the integrators which is slightly attenuated for reasons which will appear later. Only one of the signals being applied to the other input of all of the difference amplifiers through the resistors 35A, 35B, etc., from the integrators matches this largest amplitude signal. All others are less. Accordingly, only one difference amplifier will provide a zero output. That is the one receiving the largest amplitude signal. The reason for slightly attenuating the signal applied by the integrators to the difference amplifiers is because otherwise the signal received from the diodes will not be equal to this signal. When these signals are substantially equal, no output is obtained from the difference amplifier associated with the integrator circuit providing the largest output. All the other difference amplifiers provide a negative output.

The largest signal output of the diodes is also applied to another Schmitt trigger circuit 40 the function of which is to act as a minimum signal detector. The parameters of this Schmitt trigger circuit are selected so that it is only triggered when the amplitude of the largest signal being received exceeds a predetermined level, which should exceed the level of noise. If the Schmitt trigger 40 is tripped, it indicates therefore that a meaningful or valid signal has been read. The outputs from both the minimum signal Schmitt trigger 40 and the Schmitt trigger 25 are required to open a minimum signal gate 42. The output from this gate is an amplitude-limited signal occurring near the end of the character-reading interval. This signal is applied to an output terminal 44 to signify the presence of a character.

The output of each difference amplifier is applied to a separate amplifier-clipper circuit 46A, 46B, etc. The output of each amplifier-clipper circuit is applied through a summing resistor 48A, 48B, etc., to a succeeding Schmitt trigger circuit 54A, 54B, etc., which acts as an output gate. The output from the minimum signal gate 42 is applied through separate summing resistors 52A, 52B, etc., to the inputs of the Schmitt triggers 54A, 54B, etc. This output alone is capable of tripping a Schmitt trigger circuit. The sum of the two inputs to these trigger circuits, in the case of all but the input from the zero-output difference amplifier, is less than the required triggering level because, it will be recalled, the outputs from the difference amplifiers are negative. The difference amplifier associated with the integrator which has received the largest amplitude signal has a zero output, and, therefore, the Schmitt trigger connected thereto can be driven by the output from the minimum signal gate 42. Thus only one of the Schmitt triggers or output gates 54A, 54B, etc., will provide an output signal to the output terminals 56A, 56B, etc., indicative of the character which passed under the reading head. This signal occurs substantially simultaneously with the "character presence" signal.

As a further insurance that only a meaningful output is present at the output terminals, a "multiple output detector" Schmitt trigger circuit 58 is employed. This Schmitt trigger is coupled by resistors 60A, 60B, etc. to each of the outputs of the output gates 54A, 54B, etc Thus, in the event of an output from two or more output gates, the multiple-output detector is driven to provide an output at its associated terminal 62. This may be employed to negative the effects of the false outputs.

Accordingly, from the above description, it will be realized that only one of ten lines will have an output voltage and this will be the one of the ten lines which corresponds to the number which is the character passing under the reading head at the time. Similarly, the system can be extended to include letters of the alphabet or, if desired, numbers in different combinations may be used to represent alphabet letters. The frequency-selective networks, or filters, are well-known circuitry and will not be described herein. However, it should be noted that the range of acceptability or pass-band of the filters can be made nearly equal to plus or minus one-half of the separation between the center frequencies of the pass-band of each filter. Thus, errors cannot occur until the frequency deviates beyond the channel crossover point. By "channel" is meant the band-width of the pass-band of a filter. Thus, variations in frequency which are due to paper expansion, shrinkage, or variable scan speed can cause a double output. Detection of the simultaneous presence of two positive outputs at the ten output leads can be the means of an automatic rejection. However, by having markings present on the document which can be employed to control the table speed, sufficient compensation can be made for these factors to eliminate them from consideration substantially.

In an embodiment of the invention which was built, scan speeds up to 300 inches per second were employed with lines varying from a density of 50 to 400 lines per inch, a minimum character size of approximately one-tenth by one-sixteenth inches was used; the frequency separation which usually was between seven to fifteen percent; and the required adjacent-channel-frequency selectivity was between 3 and 10 db. These figures are provided merely by way of example, and are not to be considered as a limitation upon the invention.

Figure 3 is a circuit diagram of a preferred type of amplifier-clipper circuit. It comprises a first tube 70 which is a cathode-follower tube and a second tube 72 which is cathode coupled thereto. The second tube 72 is biased to be conducting by means of the series resistors 74, 76 which are coupled to its grid and across the power supply. A diode 78 is connected from the common-cathode connection to ground. The diode serves to clamp the common cathode to ground potential. Thus input signals cannot drive the cathodes more negative than ground potential. The output from the second tube anode will therefore be a signal which cannot exceed a given amplitude, as determined by the circuit parameters, in view of the operation of the diode 78 which, in effect, shorts the cathodes to ground when the cathode voltage tries to go more negative than ground potential. The circuit components and parameters of the input stage are chosen so that a signal a few volts positive applied to the input grid cuts off the second triode via its cathode. Thus, the circuit is made to operate at the most linear portion of the characteristics.

Figure 4 is a circuit diagram of a preferred type of stabilized amplifier which may be employed in the embodiment of the invention. It includes two tubes 80, 82, with the anode of the first being coupled to the grid of the second to apply its output thereto. The grid of the second tube is coupled through a resistor 84 to the grid of the first tube; thus, some of the first-tube output signal is fed back to oppose some of the input signal. Since if the input signal is large, the part fed back is large, and, if the input signal is small, the part fed back is small, the output of the amplifier may be said to be stabilized. This output is taken from the cathode of the second tube.

Figure 5 shows an integrator circuit suitable for utilization in the embodiment of the invention. It includes a pair of tubes 90, 92. The actual integration is performed by the series resistor 94 which connects the cathode of the first tube to the parallel-connected condenser 96 through the rectifier 98. The resistor 100 connected across the condenser is a high-value bleeder. The grid of the second tube is connected to the condenser 96 and through a coupling diode 102 to the gate-pulse flip-flop. The integration network and the grid are held at ground potential by the gate-pulse flip-flop connected to the diode 102. Thus, the circuit is prevented from integrating. Upon the gate-pulse flip-flop applying a positive pulse to the diode 102, it ceases conduction and thereby disconnects the grid and integration network and permits them to function to integrate any signal which is applied thereto via the input grid of the first tube 90. Effectively both first and second tubes are cathode followers with signal from the cathode of the first tube being integrated, and then applied to the grid of the second tube. Output is taken from the cathode of the second tube. Only positive-going signals are integrated. This is assured by the use of the rectifiers in the circuit.

The difference amplifiers are well-known circuits and each is merely an amplifier circuit which amplifies the excess of an input signal over a reference potential. The reference potential is that set by the largest signal received through the diodes. The largest signal which is received directly from the integrating network is somewhat larger than this because of the attenuation provided by the diodes and input resistors. These difference-amplifier circuits are shown, for example, on pp. 359 et seq. of the book Waveforms by Chance et al., published by the McGraw-Hill Book Company in 1949.

There has therefore been described above a novel, useful, and simple arrangement which enables the conversion of data which is written in human language directly into machine language by means of an embodiment of this invention. The output from the ten lines may be applied to a conversion matrix to provide any desired output code. Although as described a single frequency has been assigned to identify each character, it is well within the range of those skilled in this art to employ double and even triple frequencies or irregular line spacings within the confines of a character for its identification. This is still to be considered within the scope of this invention, as set forth in the claims which follow herein.

We claim:

1. Apparatus for converting human language printed on a document into machine language wherein each different character on said document has a different number of lines per unit of length, said apparatus comprising means for generating an electrical signal from a character having a predominating frequency representative of said character, a plurality of filters each tuned to pass a different frequency band, each of said different frequency bands including a different one of said predominating frequencies, means for separately integrating the output of all of said plurality of filters, means for providing an output in machine language representative of the character from which the electrical signal was generated responsive to the largest of the integrated outputs, and means responsive to the largest output to eliminate response to an integrated output of less than said largest output irrespective of the magnitude thereof, whereby only one output occurs and that corresponding to the character producing the largest output.

2. Apparatus as recited in claim 1 wherein each character on said document is printed in a magnetizable ink, and said means for generating an electrical signal for each character includes means for magnetizing said magnetizable ink, a magnetic reading head, and means for moving said magnetic reading head and said document relative to one another at a substantially constant velocity and at an angle to the lines in each character to successively pass each character to be read on said document under said magnetic reading head.

3. Apparatus for converting human language printed on a document into machine language wherein each different character on said document has a different number of lines per unit of length, said apparatus comprising means for generating from a character an electrical signal having a predominating frequency, said means including a reading head, and means to move said document and said reading head relative to one another to pass said characters to be read thereunder, a plurality of filters each tuned to pass a different frequency band each of said different frequency bands including a different one of said predominating frequencies, a plurality of integrating networks a different one of which is connected to receive output from a different one of said filters, means to provide an output indicative of the integrating network having the largest output including a separate means connected to each integrating network for subtracting the largest integrating-network output from each of the other integrating-network outputs, a plurality of gates, a different one of which is connected to the output of a different one of said means for subtracting, means to provide a signal responsive to the presence of a character under said reading head, means to enable said integrating networks responsive to a signal from said means to provide a signal responsive to the presence of a character, and means to open one of said gates responsive to the largest integrating-network output exceeding a predetermined minimum and an output from one of said means for subtracting.

4. Apparatus as recited in claim 3 wherein said means to provide a signal responsive to the presence of a character under said reading head includes a first trigger circuit having a stable condition from which it is driven upon the application of a signal and to which it returns upon the removal of said signal, and means to apply a signal to said first trigger circuit responsive to said means for generating an electrical signal from a character.

5. Apparatus as recited in claim 3 wherein said means for subtracting the largest integrating network output from each of the other integrating-network outputs includes a plurality of difference amplifiers each having a first and second input, means for applying the output of each integrating network to the first input of a different one of said integrating amplifiers, and means for applying the largest integrating-network output to all of said second inputs.

6. In apparatus for recognizing each of a plurality of different characters on a document, each of said characters comprising a region of substantially parallel equispaced lines, the spacing between said lines being different for each different character to be recognized, wherein means is provided for moving each of said characters relative to a reading head, said head being responsive to said character lines for generating an output signal having a predominant frequency characteristic of the line spacing of said character, the combination comprising; a plurality of frequency selective networks, each of said networks corresponding to a different characteristic frequency, each of said networks being adapted to deliver an output signal greater than that delivered by any other of said networks in response to a signal bearing the characteristic frequency corresponding thereto, means for applying said reading head output signal to all of said frequency selective networks, and means for sensing the output signals delivered by all of said frequency selective networks to determine which one of said network output signals has the greatest amplitude and for producing a signal identifying the one of said networks which delivers said greatest amplitude output signal.

7. In apparatus for recognizing each of a plurality of different characters on a document, each of said characters comprising a plurality of parallel equispaced magnetized lines, the spacing between said lines being different for each different character to be recognized, wherein means is provided for moving each of said characters relative to a reading head, said head being responsive to the magnetic fields of said character lines for generating an output signal having a predominant frequency characteristic of the line spacing of said character, the combination comprising; a plurality of frequency selective networks, each of said networks corresponding to a different characteristic frequency, each of said networks being adapted to deliver an output signal greater than that delivered by any other of said networks in response to a signal bearing the characteristic frequency corresponding thereto, means for applying said reading head output signal to all of said frequency selective networks, and sensing means for sensing the output signals delivered by all of said frequency selective networks to determine which one of said network output signals has the greatest amplitude and for producing a signal identifying the one of said networks which delivers said greatest amplitude output signal.

8. Apparatus as in claim 7 wherein said sensing means comprises first means coupled to receive the output signals of all of said frequency selective networks and in response thereto for delivering an output signal corresponding to the network output signal having the greatest amplitude, and second means coupled to receive all of said network output signals and responsive to said first means output signal for transmitting only said network output signal having the greatest amplitude.

9. Apparatus for recognizing each of a plurality of different characters on a document, each of said characters comprising a plurality of parallel equispaced magnetized lines, the spacing between said lines being different for each different character to be recognized, comprising; means for moving each of said characters relative to a reading head, said head being responsive to the magnetic fields of said character lines for generating an output signal having a predominant frequency characteristic of the line spacing of said character, a plurality of frequency selective networks, each of said networks corresponding to a different characteristic frequency, each of said networks being adapted to deliver an output signal greater than that delivered by any other of said networks in response to a signal bearing the characteristic frequency corresponding thereto, means for applying said reading head output signal to all of said frequency selective networks, and means for sensing the output signals delivered by all of said frequency selective networks to determine which one of said network output signals has the greatest amplitude and for producing a signal identifying the one of said networks which delivers said greatest amplitude output signal.

10. In apparatus for recognizing each of a plurality of different characters on a document, each of said characters comprising a region of substantially parallel equispaced lines, the spacing between said lines being different for each different character to be recognized, wherein means is provided for moving each of said characters relative to a reading head, said head being responsive to said character lines for generating an output signal having a predominant frequency characteristic of the line spacing of said character, the combination comprising; a plurality of frequency selective networks, each of said networks corresponding to a different characteristic frequency, each of said networks being adapted to deliver an output signal greater than that delivered by any other of said networks in response to a signal bearing the characteristic frequency corresponding thereto, means for applying said reading head output signal to all of said frequency selective networks, and means for sensing the output signals delivered by all of said frequency selective networks to determine which one of said network output signals has the greatest amplitude and for producing a signal identifying the one of said networks which deliver said greatest amplitude output signal, said last means including means responsive to the output signal of largest amplitude to prevent outputs of lesser amplitude from affecting such identification irrespective of the amplitude of said lesser amplitude output.

11. In apparatus for recognizing each of a plurality of different characters on a document, each of said characters comprising a plurality of parallel equispaced magnetized lines, the spacing between said lines being different for each different character to be recognized, wherein means is provided for moving each of said characters relative to a reading head, said head being responsive to the magnetic fields of said character lines for generating an output signal having a predominant frequency characteristic of the line spacing of said character, the combination comprising; a plurality of frequency selective networks, each of said networks corresponding to a different characteristic frequency, each of said networks being adapted to deliver an output signal greater than that delivered by any other of said networks in response to a signal bearing the characteristic frequency corresponding thereto, means for applying said reading head output signal to all of said frequency selective networks, and sensing means for sensing the output signals delivered by all of said frequency selective networks to determine which one of said network output signals has the greatest amplitude and for producing a signal identifying the one of said networks which delivers said greatest amplitude output signal, said last means including means responsive to said output of largest amplitude to prevent outputs of lesser amplitudes from affecting such identification irrespective of the amplitude of said outputs of lesser amplitudes.

12. Apparatus for recognizing each of a plurality of different characters on a document, each of said characters comprising a plurality of parallel equispaced magnetized lines, the spacing between said lines being different for each different character to be recognized, comprising; means for moving each of said characters relative to a reading head, said head being responsive to the magnetic fields of said character lines for generating an output signal having a predominant frequency characteristic of the line spacing of said character, a plurality of frequency selective networks, each of said networks corresponding to a different characteristic frequency, each of said networks being adapted to deliver an output signal greater than that delivered by any other of said networks in response to a signal bearing the characteristic frequency corresponding thereto, means for applying said reading head output signal to all of said frequency selective networks, and means for sensing the output signals delivered by all of said frequency selective networks to determine which one of said network output signals has the greatest amplitude and for producing a signal identifying the one of said networks which delivers said greatest amplitude output signal, said last means including means responsive to said output of largest amplitude to prevent outputs of lesser amplitudes from affecting such identification irrespective of the intensity of said lesser outputs.

References Cited in the file of this patent

UNITED STATES PATENTS

| | | |
|---|---|---|
| 2,198,248 | Hansell | Apr. 23, 1940 |
| 2,369,662 | Deloraine | Feb. 20, 1945 |
| 2,380,666 | Morrison | July 31, 1945 |
| 2,406,813 | De Rosa | Sept. 3, 1946 |
| 2,427,383 | Bryce | Sept. 16, 1947 |
| 2,457,149 | Herbst | Dec. 28, 1948 |
| 2,487,511 | Bedford | Nov. 8, 1949 |
| 2,517,102 | Flory | Aug. 1, 1950 |
| 2,552,156 | De France | May 8, 1951 |
| 2,646,465 | Davis | July 21, 1953 |
| 2,739,298 | Lovell | Mar. 20, 1956 |

OTHER REFERENCES

Printing Inks (Ellis), published by Reinhold Pub. Co., 1940 (page 344 relied on).